April 20, 1965  M. R. KRAMER  3,179,864
TORQUE NEUTRALIZING SYSTEM FOR SERVO SYSTEMS
Filed May 18, 1961  2 Sheets-Sheet 1

INVENTOR.
MARTIN R. KRAMER
BY
ATTORNEY

INVENTOR.
MARTIN R. KRAMER
BY
ATTORNEY

United States Patent Office 3,179,864
Patented Apr. 20, 1965

3,179,864
TORQUE NEUTRALIZING SYSTEM FOR
SERVO SYSTEMS
Martin R. Kramer, Jackson Heights, N.Y., assignor to
United Aircraft Corporation, East Hartford, Conn., a
corporation of Delaware
Filed May 18, 1961, Ser. No. 110,992
3 Claims. (Cl. 318—28)

My invention relates to a servo system and more particularly to an improved servo system which overcomes defects in servo systems of the prior art.

Various servo systems are known in the prior art. Synchros employed in servo systems known in the art embody the defect that the output voltage lags the input voltage owing to resistance and leakage reactance of stator windings to produce a quadrature error which varies with rotation of the input shaft. Further, servo systems of the prior art which embody rotating magnetic fields require a relatively high input torque which in many instances is undesirable.

I have invented an improved servo system which is more accurate than servo systems of the prior art in that no quadrature error is present in the system. My servo system requires only a very low input torque as compared with that required by servo systems of the prior art. My servo system readily lends itself to miniaturization. I employ a novel phase detector to generate the error signal of my servo system. My phase detector overcomes the defects present in phase detectors of the prior art employing "matched" crystals. My servo system produces a phase angle error in degrees which is identical to the mechanical error in degrees between the input shaft and the output shaft of the system.

One object of my invention is to provide an improved servo system which overcomes the defects of servo systems known in the prior art.

Another object of my invention is to provide a servo system which is more accurate than servo systems of the prior art in that it generates no quadrature error.

A further object of my invention is to provide a servo system requiring only a very low input torque.

Still another object of my invention is to provide a servo system which readily lends itself to miniaturization.

Yet another object of my invention is to provide a servo system including a phase detector which overcomes the defects of phase detectors known in the prior art.

A still further object of my invention is to produce a servo system in which the phase angle error in degrees is identical to the mechanical error in degrees.

Other and further objects of my invention will appear from the following description.

In general my invention contemplates the provision of a servo system in which I apply an input signal to respective first and second phase shifters one of which has a command shaft and the other of which has a follow-up shaft and each of which is adapted to shift the phase of a signal applied thereto proportionally to the displacement of its shaft. I multiply the output signals from the two phase shifters to generate a direct current voltage which provides a measure of the difference in phase between the phase shifted signals. My system includes means responsive to this direct current signal for driving the follow-up shaft to a position at which the direct current signal disappears.

In the accompanying drawings which form part of the instant specification and which are to be read in conjunction therewith and in which like reference numerals are used to indicate like parts in the various views.

Figure 1:
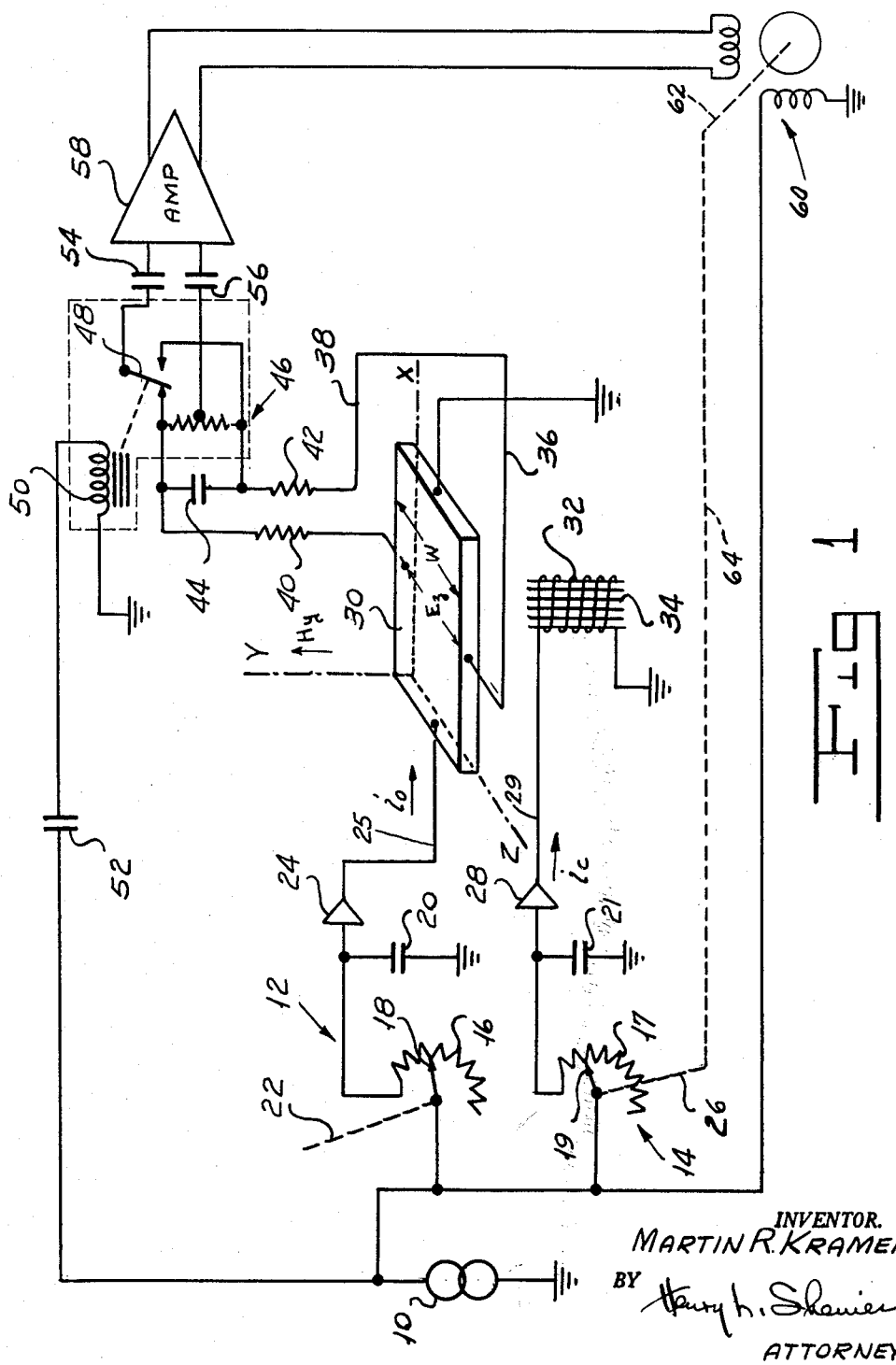
FIGURE 1 is a schematic view of one form of my Hall effect servo system.

Referring now to FIGURE 1 of the drawings, one form of my servo system includes a source 10 of an input signal which I apply to respective phase shifting networks 12 and 14. Network 12 includes a variable resistor having a winding 16 and a brush 18 connected to the source 10. Network 14 includes a variable resistor having a winding 17 and a brush 19 connected to the source 10. Networks 12 and 14 include respective capacitors 20 and 21. As is known in the art, the phase of the output signal of the networks 12 and 14 is determined by the value of the resistance of the network. I provide a command shaft 22 for driving the brush 18 to shift the phase of the output signal appearing at the output of network 12. A follow-up shaft 26 is adapted to be driven to move the brush 18 of phase shifter 14 along its associated winding 16 to shift the phase of the output signal of network 14.

My servo system includes Hall effect material 30 formed of any suitable semiconductor material such, for example, as indium arsenide, indium antimonide, bismuth, gallium arsenide and indium telluride or any other suitable material exhibiting the Hall effect to an appreciable degree. As is known in the art, in response to passage through the material 30 of a current and a magnetic flux along mutually perpendicular axes there is generated in the crystal an output voltage along an axis perpendicular both to the current axis and to the flux axis. I have indicated the X, Y, and Z axes of the material 30 by dot-dash lines in FIGURE 1. A buffer amplifier 24 applies the output of network 12 to material 30 to cause a current $i_o$ to flow through the material in the direction of the X axis. A buffer amplifier 28 applies the output of network 14 to a coil 32 carried by a suitable core 34 to produce a magnetic field passing through the crystal 30 in the direction of the Y axis. As is pointed out hereinabove, in response to the current $i_o$ passing through the crystal 30 in the direction of the X axis and in response to the flux generated by the current $i_c$ flowing through the coil 32 there is generated in the crystal 30 a voltage in the direction of the Z axis. The voltage $E_Z$ generated in the direction of the Z axis by the current $i_o$ flowing through the crystal 30 in the direction of the X axis and the magnetomotive force $H_y$ in the direction of the Y axis can be expressed by the relationship:

(1) $$E_Z = R_H j_x H_y$$

where $R_H$ is the Hall constant for the particular material used and $j_x$ is the current density in the direction of the X axis. If $i_o = I_o \cos(wt+\varphi)$ and $i_c = I_c \cos wt$ then:

(2) $$E_Z = \frac{R_H N}{W} i_o i_c$$

where N is the number of turns in coil 32 and W is the width of the crystal in the direction of the Z axis. Equation 2 can be rewritten as:

(3) $$E_Z = K I_o I_c \cos(wt+\varphi) \cos wt$$

By trigonometric identity Equation 3 becomes:

(4) $$E_Z = K'[\tfrac{1}{2}\cos(2wt+\varphi) + \tfrac{1}{2}\cos \varphi]$$

where $K/2 \cos \varphi$ is a D.C. term representing the phase difference between the outputs of the two phase shifters 12 and 14.

Since the phase of the output signal of each of the networks 12 and 14 is determined by the position of its input shaft, the phase difference between the two output signals $i_o$ and $i_c$ is a measure of the difference in angular position of the two shafts. It will be seen that crystal 30 in producing the output voltage $E_z$ multiplies the two input signals to produce an output signal containing a direct current term representing the phase diference. Respective conductors 36 and 38 apply the voltage generated along the X axis to a filter including resistors 40 and 42 and a capacitor 44. I apply the output of the filter to a chopper indicated generally by the reference character 46 and the armature 48 of which is operated by a winding 50 coupled to the source 10 by a phase shifting capacitor 52. Respective capacitors 54 and 56 apply the chopper output to an A.C. amplifier 58. It will be apparent that the chopper 46 produces an A.C. output signal of a magnitude proportional to the Hall crystal output voltage. Amplifier 58 feeds this signal to one phase of a two phase motor 60 the other phase of which is supplied from the source 10. Owing to the arrangement just described, the motor 60 drives its shaft 62 in a direction determined by a polarity of the output of the filter and through an angle proportional to the magnitude of the filter output. It will be appreciated that this rotation of shaft 62 is a measure of the difference in phase of the output signals from networks 12 and 14. A linkage 64 connects shaft 62 to shaft 26 to shift the phase of the output signal of network 14 to a point at which it is in phase with the output signal of network 12 to balance the system.

Figure 2:
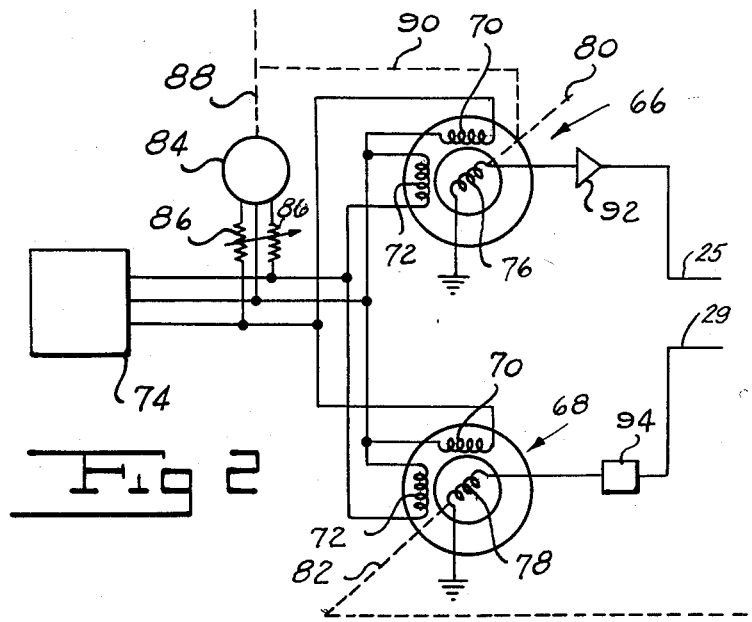
FIGURE 2 is a schematic view illustrating an alternate form of phase shifter which I may employ in my servo system.

Referring now to FIGURE 2, I have shown an alternate form of my invention in which I employ respective resolvers 66 and 68 as the phase shifting elements of the device. I connect the stator winding 70 and 72 of each of the resolvers 66 and 68 to two phases of a two phase signal source 74 to produce a rotating field in each of the resolvers. Under the action of these rotating fields, there are induced in the respective rotors 76 and 78 of the resolvers voltages the phase difference between which is determined by the relative angular positions of the rotor shafts 80 and 82 of the two resolvers. In this form of my invention owing to the fact that a rotating field exists in the stator of the resolver 66 there is a torque tending to rotate the rotor 76. I connect a two phase motor 84 to the source 62 and I place ganged variable resistors 86 in the two input phases of the motor to cause the motor to produce a compensating torque on its output shaft 88 which I apply to the shaft 80 through a linkage 90. A buffer amplifier 92 applies the output of rotor 76 to the Hall crystal. I dispose a network 94 in the line connecting rotor 78 to coil 32 to introduce a small amount of lag to compensate for the effect of the inductance of coil 32.

Figure 3:
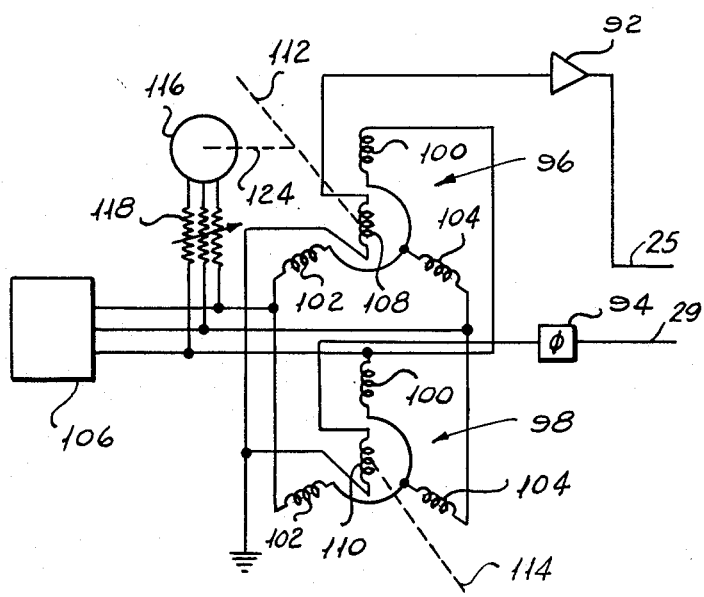
FIGURE 3 is a schematic view of a further form of phase shifter which I may employ in my servo system.

Referring now to FIGURE 3 of the drawings, in the third form of my invention I employ synchros 96 and 98 as the phase shifters of my servo system. I connect the stator windings 100, 102 and 104 of the synchros 96 and 98 to the output conductors of a three phase signal source 106 to produce rotating fields in the stators of the synchros. Under the influence of these rotating fields there are induced in the respective rotor windings 108 and 110 of the synchros 96 and 98 voltages which are displaced in phase by an amount proportional to the difference in angular displacement of the rotor shafts 112 and 114. Owing to the fact that a rotating magnetic field exists in the stator of the synchro 96, a torque tending to turn the shaft 112 of synchro 96 is generated. I connect a three phase motor 116 to the source 106 through ganged variable resistors 118 and I set the resistors to a value to cause the shaft 120 of motor 116 to produce a torque which compensates for the torque tending to turn the shaft 112 to which shaft 120 is connected. I have indicated corresponding conductors in FIGURES 1, 2, and 3 for applying currents to the crystal 30 and to the winding 32 by the respective reference characters 25 and 29.

In operation of the form of my servo system shown in FIGURE 1, input shaft 22 is moved to change the resistance of winding 16 connected in the phase shifter network 12 to shift the phase of the current $i_o$ passing through the crystal 30. This change in phase of the current $i_o$ changes the D.C. signal applied to the chopper 46 to vary the input to the A.C. amplifier 58. Thus the voltage applied to the control phase of motor 60 drives shaft 62 and linkage 64 to move shaft 26 in a direction to shift the phase of the current $i_c$ so that it is in phase with the current $i_o$. When these two currents are in phase, no D.C. signal is applied to the chopper 46 and the system is at a null.

It is to be noted that the arrangement of the Hall crystal 30 employed in my servo system embodies a distinct advantage over phase detectors of the prior art which employ "matched" crystals or the like in determining phase difference. In these phase systems of the prior art there is inherently some error owing to the fact that the crystals are never perfectly matched. Since it is not required that any matching be done in my phase detector, error resulting from the difference in "matched" elements is not present.

Referring now to FIGURES 2 and 3, the operation of these systems is substantially similar to that of the systems shown in FIGURE 1 in that rotation of input shaft 80 or input shaft 112 results in a feedback signal which causes the follow-up shaft 82 and 114 to occupy the same position as does the input shaft. In connection with these forms of my invention it is to be noted that since the stator windings of the resolvers 66 and 68 or of the synchros 96 and 98 both are energized from the same source, no "quadrature" errors are generated and thus these forms of my servo system are more accurate than are systems of the prior art in which quadrature errors are generated.

It will be seen that I have accomplished the objects of my invention. I have provided an improved servo system in which no quadrature error is generated. My system requires a relatively low input torque as compared with that required in servo systems of the prior art. My system includes a novel phase detector which obviates errors which are generated in phase detectors of the prior art employing crystals which are not perfectly matched. The phase angle error of my system in degrees is equal to the mechanical error in degrees between the input shaft and the output shaft.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A servo system including in combination a source of a two-phase input signal, a first resolver having two-phase stator windings and a rotor winding and an input shaft, said first resolver being adapted to produce an output signal having a phase determined by the angular position of said input shaft, a second resolver having two-phase stator windings and a rotor winding and an input shaft, said second resolver being adapted to produce an output signal having a phase determined by the angular position of its input shaft, means for applying the signal from said source to said first and second resolver stator windings to produce a rotating field in said first resolver stator, means responsive to said resolver output signals for producing an error signal as a function of the phase difference between said resolver output signals, means responsive to said error signal for driving one of said input shafts to reduce said error signal to zero and means for applying a neutralizing torque to the input shaft of said first resolver to neutralize the torque resulting from said rotating field in said first resolver stator.

2. A servo system including in combination a source of three-phase input signal, a first synchro having three phase stator windings and a rotor winding and an input shaft, said first synchro being adapted to produce an output signal having a phase determined by the angular position of said input shaft, a second synchro having three phase stator windings and a rotor winding and an input shaft, said second synchro being adapted to produce an output signal having a phase determined by the angular position of its input shaft, means for applying the signal from said source to said first and second synchro stator windings to produce a rotating field in said first synchro stator, means responsive to said synchro output signals for producing an error signal as a function of the phase difference between said synchro output signals, means responsive to said error signal for driving one of said input shafts to reduce said error signal to zero and means for applying a neutralizing torque to the input shaft of the first synchro to neutralize the torque resulting from said rotating field in said first synchro stator.

3. A servo system including in combination a balanced polyphase source having a number of phases, a first polyphase electromagnetic device having an input shaft and a rotor and a stator, said stator having a number of phases equal to the number of source phases, said first device adapted to produce an output signal having a phase determined by the angular position of said input shaft, a second polyphase electromagnetic device having an input shaft and a rotor and a stator, said second device stator having a number of phases equal to the number of source phases, said second device adapted to produce an output signal having a phase determined by the angular position of its input shaft, means for coupling said source to said first and second device stator windings to produce a rotating field in said first device stator, means responsive to said device output signals for producing an error signal as a function of the phase difference between said device output signals, means responsive to said error signal for driving one of said input shafts to reduce said error signal to zero and means for applying a neutralizing torque to the input shaft of said first device to neutralize the torque resulting from said field in said first device stator.

References Cited by the Examiner

UNITED STATES PATENTS

| | | | |
|---|---|---|---|
| 2,183,725 | 12/39 | Seeley | 318—18 |
| 2,543,640 | 2/51 | Millar et al. | 324—45 |
| 2,564,682 | 8/51 | Fisk et al. | |
| 2,629,060 | 2/53 | Ludwig | 323—120 |
| 2,634,387 | 4/53 | Mercier | 318—30 |
| 2,760,132 | 8/56 | Pawley | 328—133 |
| 2,774,021 | 12/56 | Ehret | 307—88.5 |
| 2,791,744 | 5/57 | Carney | 323—109 |
| 2,820,143 | 1/58 | D'Nelly et al. | 307—88.5 |
| 2,922,991 | 1/60 | Frank | 318—28 |
| 2,935,660 | 5/60 | Patchell | 324—87 |
| 2,994,037 | 7/61 | Boyle et al. | 324—83 |
| 3,013,194 | 12/61 | Cary | 318—28 |
| 3,015,737 | 1/62 | Harris et al. | 307—88.5 |
| 3,064,168 | 11/62 | Dosch | 318—30 |
| 3,079,540 | 5/63 | Fillmore et al. | 318—30 |

OTHER REFERENCES

Electronic Instruments, Greenwood, Holdom, MacRae, page 385, Fig. 12.15; McGraw-Hall, New York, 1948.

JOHN F. COUCH, *Primary Examiner*.

MILTON O. HIRSHFIELD, ORIS L. RADER,
*Examiners.*